(12) United States Patent
Kooiman

(10) Patent No.: US 8,781,826 B2
(45) Date of Patent: Jul. 15, 2014

(54) METHOD FOR OPERATING A SPEECH RECOGNITION SYSTEM

(75) Inventor: Albert Kooiman, Beverwijk (NL)

(73) Assignee: Nuance Communications, Inc., Burlington, MA (US)

( * ) Notice: Subject to any disclaimer, the term of this patent is extended or adjusted under 35 U.S.C. 154(b) by 2607 days.

(21) Appl. No.: 10/532,919

(22) PCT Filed: Oct. 24, 2003

(86) PCT No.: PCT/IB03/04727
§ 371 (c)(1), (2), (4) Date: Jan. 16, 2006

(87) PCT Pub. No.: WO2004/042698
PCT Pub. Date: May 21, 2004

(65) Prior Publication Data
US 2006/0200345 A1  Sep. 7, 2006

(30) Foreign Application Priority Data
Nov. 2, 2002 (DE) .................. 102 51 113

(51) Int. Cl.
*G10L 21/00* (2013.01)
*G10L 15/00* (2013.01)
*G10L 25/00* (2013.01)

(52) U.S. Cl.
USPC ........... 704/233; 704/205; 704/226; 704/228; 704/231; 704/246; 704/275

(58) Field of Classification Search
CPC ......... G10L 15/00; G10L 15/20; G10L 15/22; G10L 15/222; G10L 21/00; G10L 21/02; G10L 21/0202; G10L 21/0205; G10L 21/0208; G10L 21/0316; G10L 21/0324; G10L 2015/00; G10L 2015/22; G10L 2015/225; G10L 2021/00; G10L 2021/02; G10L 2021/0208; G10L 2021/2085; G10L 2021/0216; G10L 2021/0364; G10L 2021/0316; G10L 2025/00; G10L 2025/78; G10L 2025/783; G10L 2025/786; G10L 2025/93; G10L 2025/932; G10L 2025/937; G01I 25/00; G01I 25/03; G01I 25/21; G01I 25/48; G01I 25/60; G01I 25/72; G01I 25/78; G01I 25/84; G01I 25/93
USPC ................ 704/205, 226, 228, 233, 231, 246; 455/101, 135, 226.1, 277.2, 423, 436, 455/437, 522, 525, 561, 562.1, 63.1, 67.11, 455/67.13, 69; 375/130, 150, 224, 260, 375/267, 340, 346, 347, E1.004; 370/208, 370/210, 235, 252, 328, 329, 331, 332, 335, 370/338, 342, 389
See application file for complete search history.

(56) References Cited

U.S. PATENT DOCUMENTS

| | | | |
|---|---|---|---|
| 4,905,286 A * | 2/1990 | Sedgwick et al. ............ 704/233 |
| 5,765,130 A * | 6/1998 | Nguyen ........................ 704/233 |
| 5,870,705 A * | 2/1999 | McAuliffe et al. ........... 704/225 |
| 5,956,675 A * | 9/1999 | Setlur et al. .................. 704/231 |
| 5,963,901 A * | 10/1999 | Vahatalo et al. ............. 704/233 |
| 5,978,763 A * | 11/1999 | Bridges ........................ 704/233 |
| 6,173,266 B1 * | 1/2001 | Marx et al. ................... 704/270 |
| 6,246,986 B1 * | 6/2001 | Ammicht et al. ............ 704/270 |
| 6,336,091 B1 * | 1/2002 | Polikaitis et al. ............ 704/233 |
| 6,381,570 B2 * | 4/2002 | Li et al. ........................ 704/233 |
| 6,466,654 B1 * | 10/2002 | Cooper et al. ............. 379/88.01 |
| 6,505,155 B1 * | 1/2003 | Vanbuskirk et al. ......... 704/246 |
| 6,574,601 B1 * | 6/2003 | Brown et al. .............. 704/270.1 |
| 6,651,043 B2 * | 11/2003 | Ammicht et al. ............. 704/275 |
| 6,724,864 B1 * | 4/2004 | Denenberg et al. ........ 379/88.16 |
| 6,754,310 B1 * | 6/2004 | Steinbrenner et al. ..... 379/29.01 |
| 7,069,221 B2 * | 6/2006 | Crane et al. .................. 704/275 |
| 7,103,542 B2 * | 9/2006 | Doyle ............................ 704/231 |
| 7,146,003 B2 * | 12/2006 | Schulz et al. ............ 379/406.01 |
| 7,295,982 B1 * | 11/2007 | Cohen et al. ................. 704/270 |
| 7,412,382 B2 | 8/2008 | Noda et al. |
| 2001/0011217 A1 | 8/2001 | Ammicht et al. |
| 2001/0012996 A1 * | 8/2001 | Bartosik ....................... 704/233 |
| 2002/0019734 A1 * | 2/2002 | Bartosik ....................... 704/231 |
| 2003/0046069 A1 * | 3/2003 | Vergin .......................... 704/228 |

FOREIGN PATENT DOCUMENTS

| | | | | |
|---|---|---|---|---|
| EP | 0895224 A2 | 2/1999 | | |
| EP | 895224 A2 * | 2/1999 | ............. | G10L 15/04 |
| EP | 1085501 A2 * | 3/2001 | ............. | G10L 15/26 |
| JP | 2000-057325 A | 2/2000 | | |
| JP | 2002244696 A * | 8/2002 | ............. | G10L 15/22 |
| JP | 2002-297186 A | 10/2002 | | |
| JP | 2002-304409 A | 10/2002 | | |
| JP | 2003-044093 A | 2/2003 | | |
| JP | 2004-144791 A | 5/2004 | | |
| WO | 0072307 A1 | 11/2000 | | |
| WO | WO 0072307 * | 11/2000 | | |

OTHER PUBLICATIONS

Tanyer, S. and Özer, Hamza "Voice Activity Detection in Nonstationary Noise", IEEE Transactions on Speech andn Audio Processing, vol. 8, No. 4. Jul. 2000. pp. 478-482.*

S Van Gerven and F Xie. "A Comparative Study of Speech Detection Methods" Proc. 5th Eur. Conf. Speech Commuications Technology EUROSPEECH '97, Rhodes, Greece, 1997.*

WordNet: a lexical database for the English language, WordNet 3.0, Cognitive Science Laboratory, Princeton University, 221 Nassau St. Princeton, NJ 08542, 1996. http://wordnet.princeton.edu/.*

Japanese Office Action for JP Application No. 2010-203561 mailed Feb. 26, 2013.

Office Action for JP 2010-203561 mailed Oct. 29, 2013.

* cited by examiner

*Primary Examiner* — Paras D Shah

(74) *Attorney, Agent, or Firm* — Wolf, Greenfield & Sacks, P.C.

(57) ABSTRACT

A method for operating a speech recognition system is described in which a speech signal ($S_1$) of a user is detected and analyzed so as to recognize speech information contained in the speech signal ($S_1$). The speech recognition system determines a reception quality value ($S_Q$) or a noise value which represents a current reception quality. The speech recognition system is switched over to a mode of operation which is less sensitive to noise and/or outputs an alert signal ($S_W$) to the user when the reception quality value ($S_Q$) drops below a given reception quality threshold or when the noise value exceeds a noise threshold. An appropriate speech recognition system is also described.

20 Claims, 3 Drawing Sheets

METHOD FOR OPERATING A SPEECH RECOGNITION SYSTEM

The invention relates to a method for operating a speech recognition system, in which method a speech signal of a user is detected and analyzed so as to recognize speech information contained in the speech signal. The invention also relates to a speech recognition system which comprises means for the detection of a speech signal of a user and a speech recognition device for analyzing the detected speech signal so as to recognize speech information contained in the speech signal.

Speech recognition systems are used increasingly in many fields of application in order to enable speech communication between a user and the relevant application, for example, an apparatus control or an automatic information service. Such speech-user interfaces have many advantages. On the one hand, generally speaking, they make hands-free operation of apparatus possible. On the other hand, they are also suitable in particular as user interfaces for partially sighted or otherwise physically handicapped persons who are not capable of reading optical displays and/or of operating input means such as a keyboard or a mouse and, therefore, have to rely on speech as a communication means. Furthermore, interfaces of this kind are used increasingly in automatic speech dialog systems. Examples of such speech dialog systems are automatic answering and information systems which nowadays are used in particular by some large companies and public services so as to offer a caller as quickly and as comfortably as possible with the desired information or to connect the caller to a station responsible for the special requests from the caller. Further examples in this respect are automatic telephone information systems, navigation systems, information services with general agenda topics or cinema and theater programs as well as arbitrary combinations of the various information systems.

The speech signal is transferred from the user to the speech recognition system in different ways or via different apparatus in dependence on the relevant application in which the speech recognition system is used. In the case of stationary dialog systems, for example, in information terminals in public places such as railway stations, airports, museums etc., the speech recognition system comprises one or more receiving channels whereto the appropriate microphones, headsets or the like are connected so as to enable the user to communicate with the terminal or the speech recognition system. The previously described automatic speech dialog systems, however, customarily can be accessed via a communication network, for example, a telephone network or the Internet, by using appropriate terminals of the user. Consequently, in that case the speech signal of the user is first detected by the terminal, after which it is converted into electrical signals and applied to a terminal of the speech dialog system via a speech and/or data channel of the communication network.

It is inherent of notably speech recognition systems which can be contacted by the users from an arbitrary environment by means of a communication terminal that the reception quality with which the speech signal is received can vary strongly, that is, even strongly within a session. The reception quality is then determined to a substantial extent by on the one hand the quality of the transmission channel, for example, the telephone link, as well as on the other hand by the background noise level which itself is dependent on the environment in which the user is present at the relevant instant. It will be evident that as the reception quality is less, the operating conditions for the speech recognition system will also be less favorable, because secondary noise or brief disturbances or interruptions of the transmission channel are liable to corrupt the recognition result. As the reception quality deteriorates further, sooner or later (depending on the sensitivity of the speech recognition system) the speech recognition system will hardly be capable of delivering recognition results that are satisfactory to some extent. It is in a drawback that exactly the speech recognition systems which respond as quickly and as naturally as possible to an utterance of a user, and hence are very comfortable per se for the user, react very sensitively to disturbances. On the other hand, speech recognition systems which, for example, allow the input of speech utterances by the user only at given, exactly defined instants, require a given, comparatively high volume during the speech input and respond comparatively slowly to utterances, are more robust in respect of a deterioration of the reception quality.

It is an object of the present invention to improve a method for operating a speech recognition system or a speech recognition system of the kind set forth in such a manner that it continues to operate with an as high as possible quality also in the event of a deterioration of the reception quality and still offers the user the maximum possible comfort.

This object is achieved in that there is determined a reception quality value or a noise value which represents a current reception quality, and in that the speech recognition system switches over to a mode of operation which is less sensitive to noise and/or outputs an alert signal to the user when the reception quality value drops below a given reception quality threshold or when the noise value exceeds a noise threshold.

Because the monitoring of a reception quality value in respect of this value dropping below a given reception quality threshold is identical, except for the use of reciprocal values as well as the corresponding reversal of the limit condition, to the monitoring of a noise value, for example, the level of a background noise signal, in respect of this value exceeding a given noise threshold, hereinafter the invention will be described in general only on the basis of the first version for the sake of simplicity, however, without the invention being restricted thereby in any way. The corresponding terms of the two versions can be interchanged at all times in the following description.

The invention enables an appropriate response of the speech recognition system itself and/or of the user to a deterioration of the reception quality, so that the user can always be offered the maximum feasible comfort in the current reception conditions while on the other hand it is ensured that as the reception conditions become worse, the quality of the recognition results is not degraded excessively.

For the response of the speech recognition system itself it is arranged that the speech recognition system switches over to a more robust mode of operation in which the reception quality has less effect on the quality of the speech recognition. For example, a voice activity detector, first detecting the incoming speech signal, could be switched to a less sensitive mode or waiting periods, elapsing until a response of the speech recognition system takes place, could be prolonged so that the speech recognition system overall no longer responds so quickly to any secondary noise. Alternatively, or additionally, an alert signal is output to the user, said alert signal preferably being a more elaborate warning message in the form of a speech signal output by the speech recognition system, so that the user himself or herself can also respond to the deterioration of the reception quality and, for example, move to a quieter environment or, when a mobile radio apparatus is used, improve the mobile radio connection by searching a suitable location.

A wide variety of combinations of the two methods of responding is feasible. For example, only an alert signal can be issued to the user or only automatic switching over to a less sensitive mode of operation can be carried out. However, simultaneously with the switching over to the more robust mode of operation an alert signal may be output to the user, said alert signal preferably containing the indication that the mode of operation has been switched over. Furthermore, it is also possible that initially only the alert signal is output to the user and that, for example, when the reception quality does not improve or deteriorates even further, switching over to the less sensitive mode of operation takes place after a given period of time.

The reception quality threshold may then also be defined so as to be variable in dependence on given parameters of the relevant application, for example, in dependence on the possible consequences of incorrect recognition of a speech signal. It is notably also possible to define a plurality of different reception quality thresholds and to activate in steps different modes of operation and/or to output alert signals to the user each time in dependence on said reception quality thresholds.

In a particularly advantageous embodiment the speech recognition system is automatically reset to the previous mode of operation when the reception quality value exceeds the reception quality threshold again. This means that the speech recognition system, for example, automatically becomes more sensitive again so that it responds more comfortably for the user as soon as the user has successfully created a better reception quality in response to the alert signal, or when the reception quality becomes better again for other reasons.

In a particularly advantageous embodiment a so-called barge-in mode of operation of the speech recognition system is switched off as soon as the reception quality drops below the reception quality threshold. This means that the speech recognition system switches over from a mode of operation in which the user has the possibility of barging in on the speech output of the speech recognition system (so-called prompts), to an "alternative" mode of operation in which the user must first await the complete output of the prompt before the user can react to the prompt of the speech recognition system. Barge-in speech recognition systems of this kind on the one hand offer the advantage that in comparison with the "alternative" systems for the user they respond substantially more naturally, that is, like a "true" interlocutor. On the other hand, an experienced user can operate such a speech recognition system substantially faster, because often the user already knows the prompts to be output so that the user can interrupt the output of the prompt by a premature response, thus substantially reducing the duration of the overall dialog.

A reception quality value can be determined in a variety of ways.

It is particularly simple to determine a reception quality value by means of a voice activity detector which, generally speaking, is already used at the input of the speech recognition system for the detection of first of all the incoming speech signal as such and to conduct it to the actual speech recognition device. The reception quality value can then be determined, for example, on the basis of a background signal received in a speech pause of the user. This means that, for example, a noise level or the basic signal energy is measured at the input during the speech pauses so as to be used as a measure of the reception quality. For example, it can thus be determined whether the user is present in a quiet or in a noisy environment. Furthermore, the reception quality value can also be determined by means of the actual speech recognition device itself, for example, on the basis of confidence values obtained for the recognition results or on the basis of other parameters which are dependent, for example, on the quality of the recognition result or on the effort made for the recognition.

The actual processing of the reception quality value within the speech recognition system can then also take place in variety of ways.

On the one hand, the voice activity detector can apply the reception quality value itself, for example, to a dialog control device. In this case, for example, a programmer of the relevant application, who configures the dialog control device in conformity with the relevant application, can specify as from which reception quality threshold the speech recognition system should react in what way or which prompts are to be output to the user.

Alternatively, or additionally, it is also possible for the voice activity detector to output a reception corruption indication signal to the dialog control device and/or other components of the system when the reception quality value drops below the reception quality threshold. The dialog control device can then respond accordingly to the reception corruption indication signal and output, for example, an appropriate prompt to the user. Moreover, the mode of operation can be changed via the dialog control device and/or the further system components.

In a particularly comfortable system an incoming signal is analyzed in more detail in respect of the type of disturbance causing the reception quality value to be below the reception quality threshold. In that case the user is provided with an alert signal in the form of a prompt which contains the relevant information. This means that an analysis is performed, for example, as to whether a poor connection between a communication terminal of the user and the speech recognition system is concerned or whether the background noise in the vicinity of the user is too loud. When the user receives the corresponding information, it will be easier for the user to react correctly so as to improve the reception quality. This analysis can be performed inter alia by means of the voice activity detector and/or the actual speech recognition device.

In order to carry out the method in accordance with the invention, a speech recognition system in accordance with the invention should comprise on the one hand an appropriate quality control device for determining a corresponding reception quality value or a noise value. On the other hand, the speech recognition system should comprise a comparator for comparing the reception quality value with a given reception quality threshold or for comparing the noise value with a given noise threshold. Finally, a speech recognition system of this kind requires appropriate control means, for example, a switching device or a suitably programmed dialog control device for switching over the speech recognition system to a mode of operation which is less sensitive to noise and/or to output an alert signal to the user when the reception quality value drops below a given reception quality threshold or when the noise value exceeds the noise threshold. The comparator may also be integrated in other components of the system, for example, in the voice activity detector or in the dialog control device.

A speech recognition system in accordance with the invention preferably is implemented to a high degree on a computer or in a speech control of an apparatus by means of suitable software. For example, the speech recognition device and the dialog control device can be realized completely in the form of software modules. A device for generating the appropriate prompts, for example, a so-called TTS converter (text-to-speech converter) can also be realized by means of suitable software. It is alternatively possible to use a prompt player which reproduces given, previously recorded prompts for the user. It is necessary, of course, that the system comprises facilities for speech input and speech output; such facilities are to be realized in the form of hardware, for example, a microphone and a loudspeaker or an interface for connection to a communication network via which the speech recognition system can be accessed by way of a terminal.

It is notably also possible that instead of the speech recognition system being realized within a single apparatus, for example, on a single server, various components of the system are situated in different locations which are connected to one another via an appropriate network. The speech recognition system in accordance with the invention can be used in conjunction with applications of all kinds. In particular it can also be made available to a plurality of applications simultaneously, that is, as a service system, for example, in the form of a time sharing system, so that it forms a respective user interface for the various applications.

The invention will be described in detail hereinafter on the basis of two embodiments and with reference to the accompanying drawings. Therein:

Figure 1:
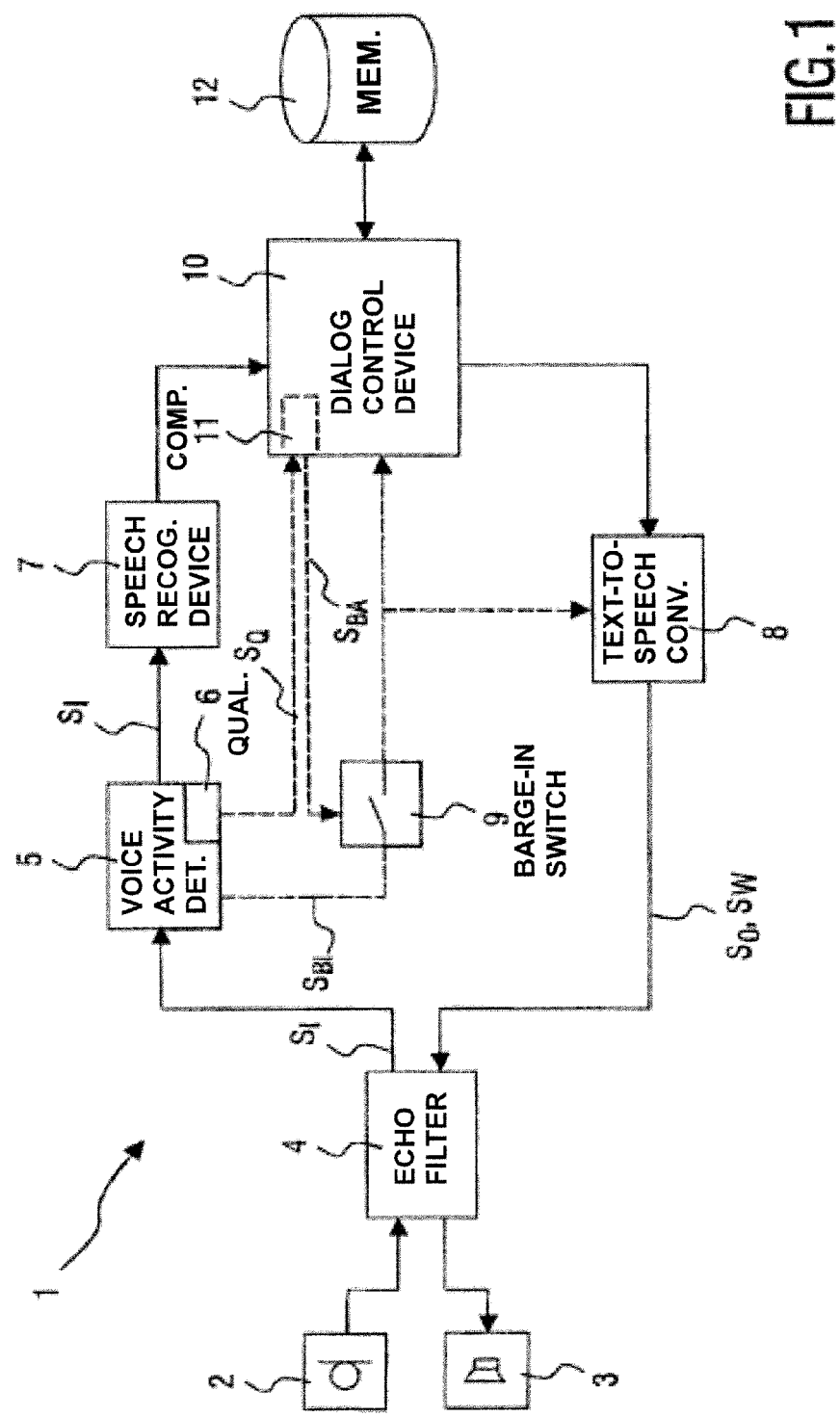
FIG. 1 shows a block diagram of a first embodiment of a speech recognition system in accordance with the invention.

The embodiments shown in the two Figures both are a speech recognition system 1 of the so-called "barge-in" type.

A microphone 2 is connected to each speech recognition system 1 in order to input a speech signal $S_1$. For the output of acoustic signals or speech output (prompts) to the user a respective loudspeaker 3 is connected to the speech recognition systems 1. Alternatively, the microphone 2 and the loudspeaker 3 may also be present in a terminal which is remote from the speech recognition system 1 itself and is connected to the speech recognition system 1 via a suitable interface, for example, a telephone network or the like.

An input signal from the microphone 2 in both speech recognition systems 1 reaches first of all an echo filter 4 which is also referred to as echo cancellator. In cases where the user speaks even though a prompt $S_O$ is still being output by the speech recognition system 1 itself, this echo filter 4 serves to remove the echo of the prompt $S_O$, which echo may be superposed on the speech signal $S_1$ in attenuated form, from the input signal.

The speech signal $S_1$ is then applied to a voice activity detector 5 which measures the signal energy and hence the voice activity of the user. This voice activity detector 5 serves on the one hand to detect the beginning and the end of a speech signal as well as speech pauses within an utterance of the user. On the other hand, this voice activity detector outputs a barge-in signal $S_{BI}$ which is applied to a text-to-speech converter 8 (referred to hereinafter as TTS converter 8) and to a dialog control device 10 in order to prevent the further output of the prompt by the TTS converter 8 in cases where a user barges into a prompt still being output.

In the present case a barge-in switching unit 9 is inserted in the output lead for the barge-in signal $S_{BI}$ of the voice activity detector 5. The system 1 is actually suitable for barging in exclusively when this barge-in switching unit 9 is in the closed state. When the switch is open (the state shown in FIG. 1), the speech recognition system 1, however, does not react to speech input of the user during the output of a prompt.

From the voice activity detector 5 the speech signal $S_I$ itself is applied to an automatic speech recognition device 7 in which the actual analysis of the speech signal $S_I$ is carried out so as to recognize the speech information contained therein.

The recognition result is then applied, in the form of text or in another machine-readable form, to the dialog control device 10.

Finally, the dialog control device 10 responds to the recognition result in a predetermined manner, that is, in conformity with a given dialog protocol, and, for example, selects from a memory 12 information desired by the user or stores data entered by the user therein. Moreover, the dialog control device drives the TTS converter 8 and supplies the converter with the data for the prompts to be output to the user. The prompts are then applied from the TTS converter 8, via the echo filter 4, to the loudspeaker 3 via which they are output. The exact construction of the dialogue control device 10, generally speaking, is dependent on the relevant application.

In accordance with the invention both embodiments shown in the drawings comprise, in addition to a barge-in switching unit 9, a quality control device 6 which forms part of the voice activity detector 5. A reception quality value $S_Q$ is determined in said quality control device 6. This signal may be, for example, the reciprocal value of a background noise level which is measured by the voice activity detector 5 prior to the beginning of the utterance and/or in the speech pauses of the user.

The reception quality value $S_Q$ is applied to the dialog control device 10 which compares the reception quality value $S_Q$ with a predetermined reception quality threshold in a comparator 11, for example, realized in the form of a software module, with a predetermined reception quality threshold. As soon as the reception quality value $S_Q$ is below the predetermined threshold, the dialog control device 10 applies a barge-in deactivation signal $S_{BA}$ to the barge-in switching unit 9 in which the switch is set to the position shown in FIG. 1. This means that the speech recognition system 1 is switched over from a mode of operation in which barging in is permissible to a mode of operation in which barging in is not permissible. This offers the advantage that in the case of an excessively high background noise threshold during the output of a prompt, the speech recognition system 1 will not be continuously interrupted because of background noise which is not associated with the user and should not lead to an interruption of the prompt. This means that the speech recognition system 1 is switched over to a mode of operation which admittedly leads to a type of dialog which is slightly less natural and hence less comfortable type for the user, but which is substantially more robust and substantially better suitable for the reception conditions occurring at the relevant instant.

Moreover, as soon as the reception quality value $S_Q$ drops below the predetermined reception quality threshold, the dialog control unit 10 ensures that the TTS generator 8 generates and outputs a relevant alert signal in the form of a suitable alert prompt $S_W$, for example, a message of the type "The background noise is too loud. Please wait for completion of the output of a prompt before responding".

The dialog control device 10 is arranged in such a manner that, when the reception quality value $S_Q$ increases beyond the predetermined reception quality threshold again, it automatically cancels the barge-in deactivation signal $S_{BA}$, thus closing the switch in the barge-in switching unit 9 again.

It is in principle up to the programmer of the dialog control device 10 to define arbitrary reception quality thresholds as from which a barge-in state is deactivated and/or at which an alert signal is issued to the user so that, if necessary, the user can look for a quieter environment in as far as possible.

Figure 2:
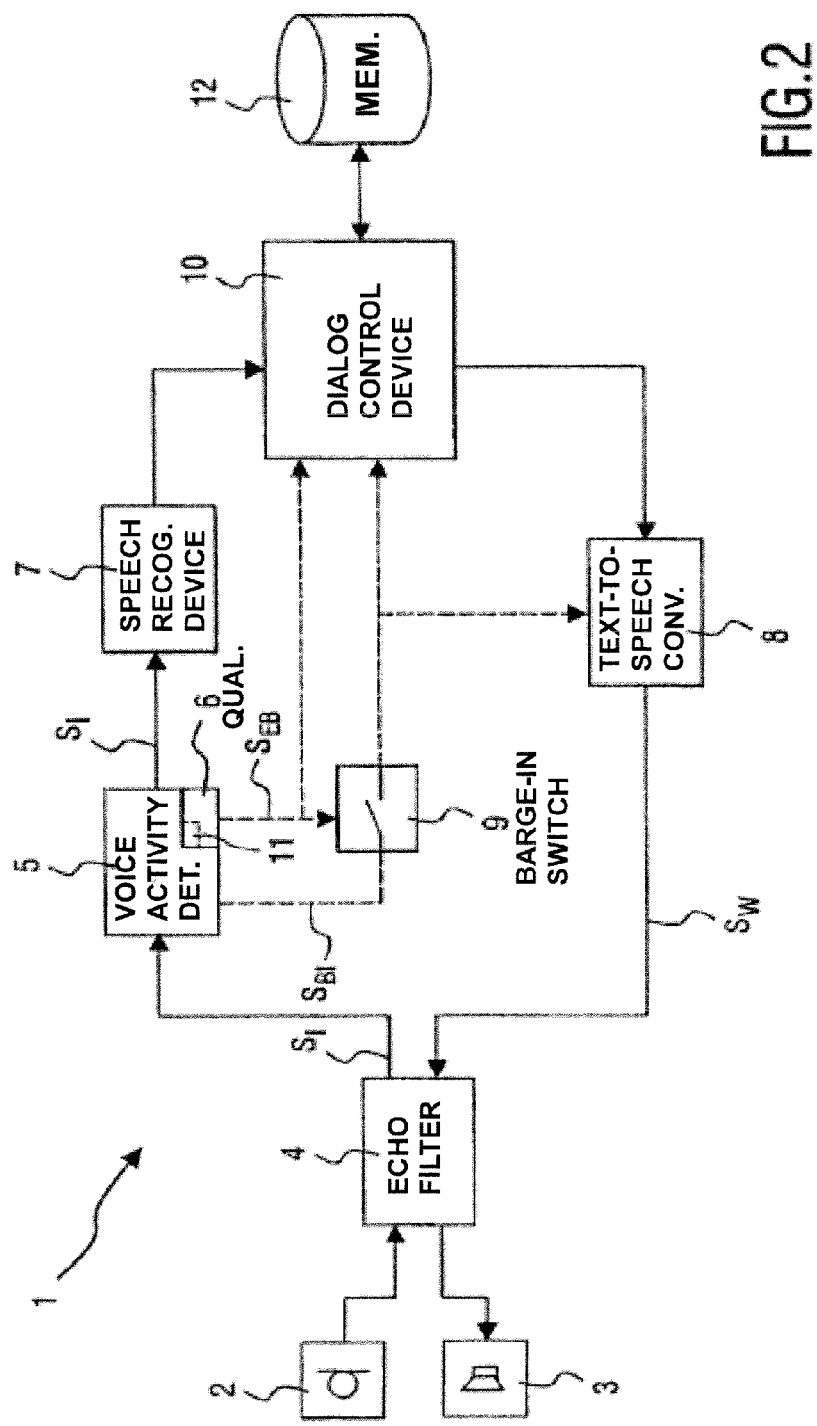
FIG. 2 shows a block diagram of a second embodiment of a speech recognition system in accordance with the invention.
Figure 3:
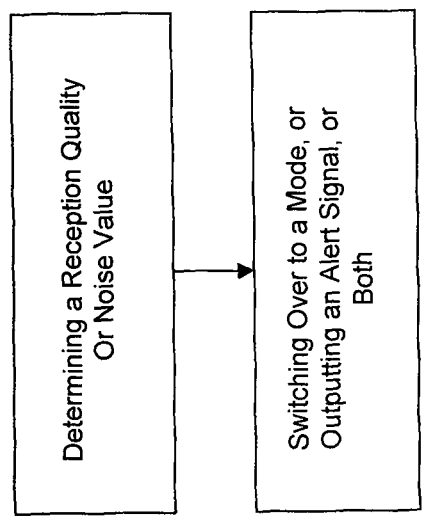
FIG. 3 is a flow chart of a method of speech recognition in accordance with a representative embodiment.

FIG. 2 shows a slightly different embodiment of a speech recognition system 1 in accordance with the invention.

In this embodiment the reception quality value $S_Q$ is compared with the reception quality threshold directly in the quality control device 6; this means that the comparator 11 is integrated in the quality control device 6. When the quality control value drops below the predetermined reception quality threshold, the quality control device 6 outputs a reception corruption indication signal $S_{EB}$ which at the same time deactivates the barge-in switching unit 9 and is applied to the dialog control device 10 in order to ensure that, in dependence on the programming, the output of a suitable alert prompt $S_W$ via the TTS converter 8 is initiated.

It is to be noted again that the speech recognition systems 1 shown in the figures are merely special embodiments of the invention and that a person skilled in the art will be capable of modifying the speech recognition systems 1 or the method for operating the speech recognition systems 1 in various manners without departing from the scope of the present invention.

For example, it is notably possible for the quality control unit 6 to form a part of the dialog control device 10. Moreover, the barge-in switching device 9 may also form a part of the voice activity detector 5 or the dialog control device 10 and be constructed, for example, also as a pure software switch. Furthermore, the quality control unit 6 may also be constructed as an independent, pure hardware module. Moreover, the speech recognition system may comprise additional components or further functions; for example, it may execute an intelligent, grammar-based barge-in method. In that case the barge-in signal is not generated already by the voice activity detector, but only by the speech recognition device which first checks whether an incoming signal actually has a content that makes sense and hence is to be considered as a barge-in event. Further variations may comprise, for example, speaker identification or other elaborations of the speech recognition system.

The invention claimed is:

1. A method for operating a speech recognition system comprising acts of:
    detecting a speech signal of a user;
    analyzing the speech signal to recognize speech information contained in the speech signal;
    determining a reception quality value or a noise value which represents a current reception quality; and
    switching the speech recognition system over to a mode of operation which is less sensitive to noise in response to determining that the noise value has exceeded a noise threshold or that the reception quality value has dropped below a reception quality threshold, or both; and
    automatically resetting the speech recognition system to a previous mode of operation in response to determining that the reception quality value has exceeded the reception quality threshold or that the noise value has dropped below the noise threshold.

2. The method of claim 1, wherein the act of switching the speech recognition system over to the mode of operation which is less sensitive to noise comprises deactivating a capability of the speech recognition system to operate in a barge-in mode of operation so that the speech recognition system does not react to speech input of the user during output of a prompt.

3. The method of claim 1, wherein the reception quality value or the noise value is determined with a voice activity detector.

4. The method of claim 1, wherein the reception quality value or the noise value is determined on the basis of a background signal which is received prior to a beginning of an utterance, or in a speech pause of the user, or both.

5. The method of claim 1, further comprising an act of:
    in response to determining that the reception quality value has dropped below the reception quality threshold or that the noise value has exceeded the noise threshold, applying a reception corruption indication signal to a dialog control device.

6. The method of claim 5, further comprising:
    in response to the dialog control device receiving the reception corruption indication signal, using the dialog control device to initiate an output of a prompt indicating that the reception conditions are poor.

7. The method of claim 1, further comprising acts of:
    analyzing an incoming signal for a type of disturbance causing the reception quality value to be below the reception quality threshold or the noise value to be above the noise threshold, and
    in response to identifying the type of disturbance in the incoming signal, outputting a prompt to the user.

8. A speech recognition system, comprising:
    at least one processor configured to detect a speech signal of a user; to analyze the detected speech signal to recognize speech information contained in the speech signal; to determine a reception quality value or a noise value, representing a current reception quality; to compare the reception quality value with a reception quality threshold or to compare the noise value with a noise threshold; to switch the speech recognition system over to a mode of operation which is less sensitive to noise in response to determining that the reception quality value has dropped below the reception quality threshold or that the noise value has exceeded the noise threshold, or both, and to automatically reset the speech recognition system to a previous mode of operation in response to determining that the reception quality value has exceeded the reception quality threshold or that the noise value has dropped below the noise threshold.

9. A non-transitory, computer readable medium encoded with instructions which, when executed by at least one processor, cause the at least one processor to carry out a method for operating a speech recognition system, the method comprising acts of:
    detecting a speech signal of a user;
    analyzing the speech signal to recognize speech information contained in the speech signal;
    determining a reception quality value or a noise value which represents a current reception quality;
    switching the speech recognition system over to a mode of operation which is less sensitive to noise in response to determining that the noise value has exceeded a noise threshold or that the reception quality value has dropped below a reception quality threshold, or both; and
    automatically resetting the speech recognition system to a previous mode of operation in response to determining that the reception quality value has exceeded the reception quality threshold or that the noise value has dropped below the noise threshold.

10. The system of claim 8, wherein the at least one processor is further configured to detect the speech signal by detecting voice activity of the user.

11. The system of claim 8, wherein the at least one processor is further configured to switch the speech recognition system over to the mode of operation which is less sensitive to noise by disabling a barge-in switching functionality so that the speech recognition system does not react to speech input of the user during output of a prompt.

12. The system of claim 8, wherein the at least one processor is further configured to control dialog based on the speech information contained in the speech signal.

13. The computer readable medium of claim 9, wherein the act of switching the speech recognition system over to the mode of operation which is less sensitive to noise comprises deactivating a capability of the speech recognition system to operate in a barge-in mode of operation so that the speech recognition system does not react to speech input of the user during output of a prompt.

14. A method for operating a speech recognition system, the method comprising:
- detecting a speech signal (SI) of a user;
- analyzing the speech signal to recognize speech information contained in the speech signal (SI);
- determining a reception quality value (SQ) or a noise value which represents a current reception quality;
- switching the speech recognition system over to a mode of operation, which is less sensitive to noise when the noise value exceeds a noise threshold or outputting an alert signal (SW) to the user when the reception quality value (SQ) drops below a given reception quality threshold, or both; and
- automatically resetting the speech recognition system to a previous mode of operation when the reception quality value (SQ) exceeds the reception quality threshold or when the noise value drops below the noise threshold.

15. The method of claim 14, wherein the act of switching the speech recognition system over to the mode of operation which is less sensitive to noise comprises deactivating a capability of the speech recognition system to operate in a barge-in mode of operation so that the speech recognition system does not react to speech input of the user during output of a prompt.

16. The method of claim 14, wherein the reception quality value or the noise value is determined with a voice activity detector.

17. The method of claim 14, wherein the reception quality value or the noise value is determined on the basis of a background signal which is received prior to a beginning of an utterance, or in a speech pause of the user, or both.

18. The method of claim 14, further comprising an act of:
- in response to determining that the reception quality value has dropped below the reception quality threshold or that the noise value has exceeded the noise threshold, applying a reception corruption indication signal to a dialog control device.

19. The method of claim 17, further comprising:
- in response to the dialog control device receiving the reception corruption indication signal, using the dialog control device to initiate an output of a prompt indicating that the reception conditions are poor.

20. The method of claim 14, further comprising acts of:
- analyzing an incoming signal for a type of disturbance causing the reception quality value to be below the reception quality threshold or the noise value to be above the noise threshold, and
- in response to identifying the type of disturbance in the incoming signal, outputting a prompt to the user.

\* \* \* \* \*